(12) United States Patent
Karlsson et al.

(10) Patent No.: US 6,671,765 B1
(45) Date of Patent: Dec. 30, 2003

(54) ARCHITECTURE ENABLING CODE OVERLAY USING A DEDICATED ENDPOINT

(75) Inventors: Magnus G. Karlsson, McKinney, TX (US); Gregory Lee Christison, McKinney, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/506,613

(22) Filed: Feb. 18, 2000

Related U.S. Application Data

(60) Provisional application No. 60/166,892, filed on Nov. 22, 1999.

(51) Int. Cl.[7] .............................................. G06F 13/36
(52) U.S. Cl. ..................... 710/310; 710/104; 713/100
(58) Field of Search .................. 710/310, 63, 100, 710/104, 10; 713/1, 2, 100

(56) References Cited

U.S. PATENT DOCUMENTS

| 5,148,539 | A | * | 9/1992 | Enomoto et al. | ............ 710/307 |
| 6,011,486 | A | * | 1/2000 | Casey | ........................ 340/7.29 |
| 6,128,673 | A | * | 10/2000 | Aronson et al. | ............ 710/315 |
| 6,145,045 | A | * | 11/2000 | Falik et al. | .................. 710/310 |
| 6,157,975 | A | * | 12/2000 | Brief et al. | .................. 710/104 |
| 6,216,183 | B1 | * | 4/2001 | Rawlins | ....................... 710/100 |
| 6,311,294 | B1 | * | 10/2001 | Larky et al. | .................. 710/63 |
| 6,421,770 | B1 | * | 7/2002 | Huch et al. | .................. 711/209 |

* cited by examiner

Primary Examiner—Paul R. Myers
(74) Attorney, Agent, or Firm—Tammy L. Williams; W. James Brady, III; Frederick J. Telecky, Jr.

(57) ABSTRACT

A USB function device (14) for coupling to a USB host (12). The USB function device (14), comprises circuitry (32) for providing a capability to the USB host, where the circuitry for the capability comprises an address space. The USB function device further comprises a USB interface circuit (136) coupled between the USB host (12) and the circuitry (32) for providing a capability to the USB host. The USB interface circuit comprises a memory area (106) comprising a code overlay endpoint (106₁) accessible to the USB host for writing two or more code blocks to the code overlay endpoint. The USB interface circuit further comprises circuitry (150–163) for communicating a first of the code blocks from the code overlay endpoint to the address space and for subsequently communicating a second of the code blocks from the code overlay endpoint to the address space. The circuitry for communicating is operable to communicate a code block from the code overlay endpoint to the address space after a start-up time of the USB function device.

29 Claims, 5 Drawing Sheets

ARCHITECTURE ENABLING CODE OVERLAY USING A DEDICATED ENDPOINT

CROSS-REFERENCES TO RELATED APPLICATIONS

This application claims the benefit, under 35 U.S.C. §119(e)(1), of U.S. Provisional Application No. 60/166,892 (TI-29868PS), filed Nov. 22, 1999, and incorporated herein by this reference.

STATEMENT REGARDING FEDERALLY SPONSORED RESEARCH OR DEVELOPMENT

Not Applicable.

BACKGROUND OF THE INVENTION

The present embodiments relate to universal serial bus ("USB") systems, and are more particularly directed to code overlay from a USB host to a peripheral.

USB is a recently-developed technology established by a joint effort of various companies. The joint-effort produced a USB Specification, Revision 1.1, Sep. 28, 1998, which is hereby incorporated herein by reference and which governs many aspects about USB systems. The USB Specification is directed to a goal of improving the user-friendliness of various aspects of computers and the peripheral devices typically used with such computers. Particularly, in a USB system, various devices connected in the prior art to a computer via either internal buses or often different external connectors are now coupled, using a USB cable, to a common USB bus. The USB bus is mastered by a USB host in a manner that requires little or no configuration by the user. Various benefits arise in USB, including the ability to add devices to, or remove devices from, a USB system while the system is operating. As another benefit, USB easily integrate various functions such as raw data, voice data, and video data. These benefits are also achieved without requiring add-on cards, and through a single protocol that supports serial data transfers between a USB host and USB-operable peripherals simply by coupling those peripherals to a common USB bus. Still further, the ability to quickly and easily connect and disconnect devices provides considerable flexibility and possible cost reduction in comparison to many contemporary systems.

While USB systems provide the various benefits set forth above, the present inventors have recognized a potential drawback in USB functions relating to device size, complexity, and cost as these factors are influenced by the program code demands of the function. Specifically, a function typically includes a processor device (e.g., a digital signal processor or "DSP") for providing the capabilities of the function (e.g., communications for a modem). The processor device accesses either on-chip memory or external memory for purposes of obtaining and executing program code to implement the function's capabilities. Further in this regard, and according to the USB Specification, at start-up of the USB device the USB host may perform a one-time download of the entire set of executable program code to the function via a bulk-type endpoint in the function. However, typically more complex capabilities bring a corresponding increase in the amount of required program code and, hence, the start-up download of program code requires a corresponding increase in the size of the memory in the function to which the program code is downloaded (either on-chip or external). In view of these limitations, there arises a need to improve the efficiency of program code demands in a USB function, as is achieved by the preferred embodiments described below.

BRIEF SUMMARY OF THE INVENTION

In the preferred embodiment, there is a USB function device for coupling to a USB host. The USB function device comprises circuitry for providing a capability to the USB host, where the circuitry for the capability comprises an address space. The USB function device further comprises a USB interface circuit coupled between the USB host and the circuitry for providing a capability to the USB host. The USB interface circuit comprises a memory area comprising a code overlay endpoint accessible to the USB host for writing two or more code blocks to the code overlay endpoint. The USB interface circuit further comprises circuitry, for communicating a first of the code blocks from the code overlay endpoint to the address space and for subsequently communicating a second of the code blocks from the code overlay endpoint to the address space. The circuitry for communicating is operable to communicate a code block from the code overlay endpoint to the address space after a start-up time of the USB function device.

BRIEF DESCRIPTION OF THE SEVERAL VIEWS OF THE DRAWING

FIG. 1b illustrates an electrical diagram of the USB hierarchy of connections between the devices of FIG. 1a.

DETAILED DESCRIPTION OF THE INVENTION

Figure 1A:
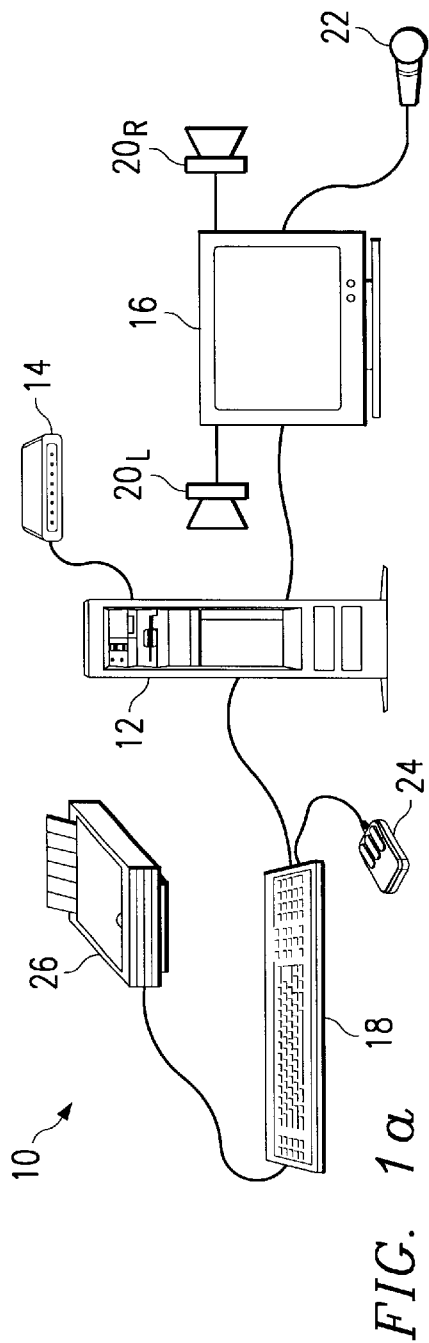
FIG. 1a illustrates a USB system including a personal computer as a USB host and various USB functions coupled to the USB host.

FIG. 1a illustrates an exemplary USB system 10 in which the preferred embodiments may be implemented. By way of introduction, system 10 includes aspects known in the USB art and further includes the preferred embodiments. To appreciate the USB context as improved by the preferred embodiments, the following discussion first explores system 10 as it relates to USB aspects in general, while a later discussion focuses on the improvements as relating to the preferred embodiments. System 10 includes a USB host 12 which, in the present example, is a personal computer ("PC"). USB host 12 includes a motherboard (not separately shown) which communicates with USB software that automatically loads device drivers in a manner that is typically transparent to the user of the PC, where the drivers support the remaining devices external from USB host 12. As further detailed later in connection with FIG. 1b, for purposes of USB communications these remaining devices may be directly connected to USB host 12, or may be coupled to USB host 12 through other devices shown in FIG. 1a. More particularly, in system 10 the devices that are directly connected to USB host 12 include an external modem 14, a monitor 16, and a keyboard 18. In contrast, the remaining devices in system 10 are coupled to USB host 12 via devices that are directly connected to USB host 12. For example, a set of speakers $20_L$ and $20_R$ are connected to monitor 16 and, thus, speakers $20_L$ and $20_R$ are coupled to USB host 12 via monitor 16. Similarly, a microphone 22 is also connected to monitor 16 and is thereby coupled to USB host 12. Completing the illustration, keyboard 18 is further connected to a mouse 24 as well as a scanner 26 and, thus, both mouse 24 and scanner 26 are coupled to USB host 12 via keyboard 18. Lastly, while in system 10 each of the illustrated devices is a USB device, in an alternative computer-based system only a subset of the total system devices may be USB-compatible.

The operation of system 10 includes numerous aspects known in both the general-purpose computer and USB arts. As to the former, an extensive detailed discussion is not presented in this document because the preferred embodiments are particularly directed to USB aspects; briefly it may be appreciated that each of the devices in system 10 operates to perform the known functionality for such a device and with respect to the PC forming USB host 12, such as data input from keyboard 18, mouse 24, scanner 26, and microphone 22, data communication to and from a remote location via modem 14, and data presentation by monitor 16 and speakers $20_L$ and $20_R$. The USB operations of system 10 are detailed throughout the remainder of this document.

Figure 1B:
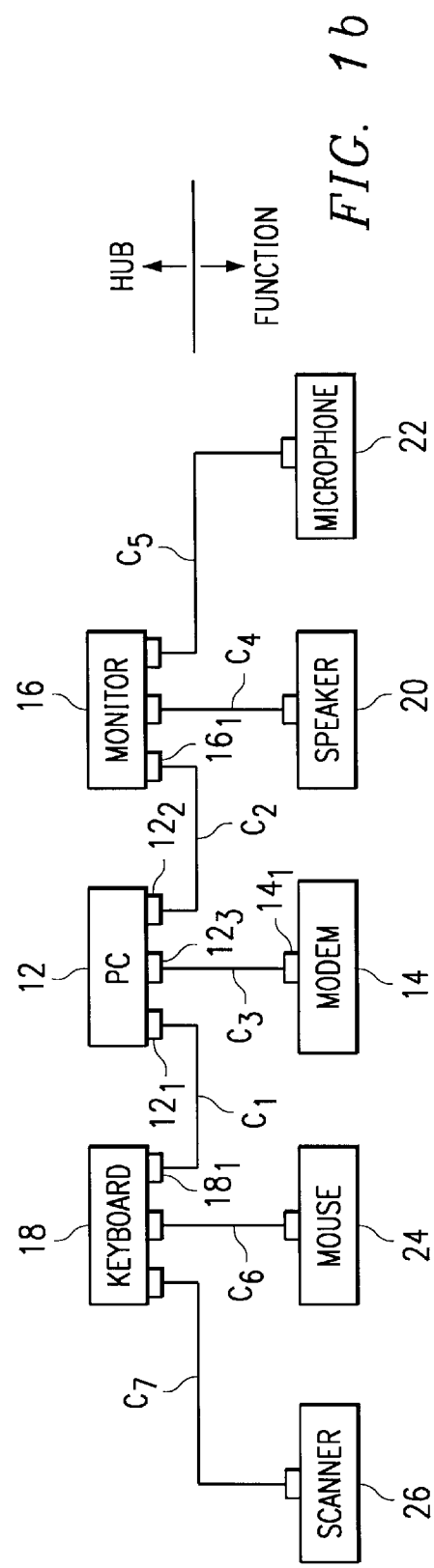

FIG. 1b illustrates an electrical diagram of the USB hierarchy of connections between the devices of FIG. 1a. As shown by a legend toward the right of FIG. 1b, each device in the upper half of FIG. 1b is referred to in the art as a hub and, thus, the hubs in system 12 include USB host 12 (i.e., the PC), keyboard 18, and monitor 16. In a USB system, the system includes a single USB host (e.g., host 12) which also serves as a hub, where the hub and any other hub in system 10 is a wiring concentrator for connecting to other USB devices, that is, it permits multiple attachments to other respective devices. To facilitate such connections, each hub includes at least one port through which it is connected either directly to the USB host or to another hub, where the connections are achieved using USB cables. Each USB cable includes four conductors, two for providing power to a USB device if the device does not obtain power via some other source, and two for data communications. The connectors on each end of a USB cable differ from one another so as to ensure that a proper end of the cable is connected in the so-called "upstream" direction toward USB host 12 while, naturally, therefore ensuring that the opposite end is connected in the so-called "downstream" direction away from USB host 12. Looking to the connections of the hubs in system 10, USB host 12 is connected from a port $12_1$, via a USB cable $C_1$, to a port $18_1$, of keyboard 18, and from a port $12_2$, via a USB cable $C_2$, to a port $16_1$ of monitor 16. As also shown by the FIG. 1b legend, each device in the lower half of the Figure is referred to in the art as a function, although in less precise usages sometimes such devices are referred to as peripherals. A function is a USB device that provides a capability to the host. In the present example, therefore, the functions include microphone 22, speakers 20, modem 14, mouse 24, and scanner 26. In addition, a hub also may serve as a function and, indeed, in system 10, each of monitor 16 and keyboard 18 is an example of a device that is both a hub and a function. Each of the functions is also connected via a corresponding USB cable to a hub. For example, a cable $C_3$ connects modem 14, via a port $14_1$, to USB host 12 via its port $12_3$. The remaining cable connections in system 10 will be readily ascertainable by one skilled in the art.

The general prior art operation of system 10 with respect to USB functionality is now further explored. USB host 12 operates in a master/slave relationship relative to each of the functions, where USB host 12 always serves as the master and each of the functions always serves as a slave. Further in this regard, USB host 12 includes a serial interface engine ("SIE") (not separately shown) that is typically incorporated into a USB controller also included with the host so that USB host 12 may communicate serial information between itself and the functions. Particularly, the serial data passes along the data conductors in the cables shown, where typically the communications at the data conductor level are referred to as USB communications along a USB bus. To facilitate its master operations, USB host 12 generally includes three software levels which, from highest to lowest are: (1) a host controller driver which links whatever specific type of device that is chosen as a USB host controller to the remaining USB software structure; (2) USB system software that communicates between the host controller driver and client software; and (3) client software which is associated with a particular function and is often provided by the manufacturer of the function so that USB host 12 may communicate with and receive the functionality of that function. Given its software levels, USB host 12 monitors the network created by the connections of system 10, and detects when a function is added to that network (or removed from that network). More particularly, upon attachment of a function to the network, USB host 12 as master detects the added function, and its communication speed, in response to a resistance change due to one or more resistors connected inside the function and which thereby change the resistive load when a USB cable is connected to that function. In response, USB host 12 electrically configures a port connection to the newly-added function. Next, USB host 12 interrogates the function in connection with a four-step process, referred to in the art as enumeration, to identify information about the function and to assign a unique address to the function. Also in connection with this process or thereafter, USB host 12 may configure the function. Finally, USB host 12 loads the appropriate driver to communicate with the function, and thereafter USB communications may proceed according to a USB protocol discussed below.

The USB protocol divides the time of communication along the USB bus into one millisecond frames. During each frame the bandwidth is shared among all devices connected to the USB bus, and each frame is subdivided into one or more packets. The use and length of packets are constrained according to various criteria set forth in the USB Specification. In general, USB host 12, as master, begins each frame by communicating a start of frame ("SOF") packet. Thereafter, communications during the frame occur according to a token protocol, that is, a transaction between host and a function occur in response to the issuance of a token followed by an order of response. Thus, USB host 12 sends a token packet which includes an address directed to one of the functions, as well as an indication of whether the data to be communicated is a read (i.e., from the addressed function to USB host 12) or a write (i.e., from USB host 12 to the addressed function). The address specifically identifies what is referred to in the USB art as an endpoint (or "device endpoint"), which is a uniquely addressable portion of a USB function that is the source or sink of information in a communication flow between the USB host and the function. The endpoint gets its name from the fact that it is typically a location in a first-in-first-out ("FIFO") memory space of the function, so for data written to the function it is written to the end, or endpoint, of a write FIFO whereas for data read from the function it is read from the end, or endpoint, of a read FIFO. Returning to the token operation, when the token reaches the addressed function, that function decodes the address and identifies itself as the destination. Next, one or more data packets are communicated along the network, where the destination function acts accordingly (i.e., either receives or transmits the data). Finally, once the data communication is complete, the recipient of the data issues a handshake packet to indicate whether the transmission was successful. This handshake indication may be either a positive acknowledgment ("ACK") or a negative acknowledgment ("NAK"). Further, in the case of a function as a data recipient, the function may provide a handshake indication of a STALL where either the intended endpoint is halted or a control request is not supported.

The USB Specification requires that USB data packet transfers fall into one of four data categories: (1) control data transfers; (2) bulk data transfers; (3) interrupt data transfers; and (4) isochronous data transfers. Each of these transfer types is detailed below. Before reaching that discussion, and by way of contrast to the preferred embodiment detailed below, it is noted that in the prior art each of these transfer types is to a like kind of endpoint. Further, in the art and as a logical construct, each such communication is referred to as along a pipe to the endpoint. For example, if a host communicates an isochronous data packet to a function, then it more particularly communicates it to an isochronous-type endpoint in the function and the communication is said to be along a pipe to that endpoint. Similarly, if a host communicates a bulk-type data packet to a function, then it communicates it along a pipe to a bulk data endpoint in the function. One skilled in the art will appreciate the application of this terminology to the remaining data transfer and corresponding endpoint types. Finally, while not fully detailed herein, the USB Specification places different constraints on different ones of the data transfer types, such as the number of bytes permitted per packet and the number of packet per frame or for a given number of frames. Some of these constraints are discussed later in this document.

Control transfers allow USB host 12 to access different parts of a function, to obtain information about the function, and to change the behavior of the function. More particularly, control transfers support configuration, command, and status type communication flows between client software in USB host 12 and a function corresponding to that software. For example, control data is used by USB host 12 to configure a function when it is first attached to system 10. Further, each USB function is required to implement an IN control pipe, with a corresponding enpdoint 0, as a default control pipe which is used by the USB system software to write control information to the function. Each USB device is also required to have an OUT control pipe (and enpdoint) to output control information. The default IN control pipe provides access to information pertaining to a USB function such as its configuration, status, and control information. Further, the USB Specification defines requests that can be used to manipulate the state of a function, and descriptors are also defined that can be used to contain different information on the device. Finally, a function optionally may provide endpoints for additional control pipes for other implementation needs, such as to accommodate implementation-specific functionality provided via customer software on USB host 12.

Bulk transfers permit communication of relatively large data groups where the data may be communicated at highly variable times and the transfer may use any available bandwidth. Bulk transfers are unidirectional and, thus, a given transfer may be only from host to function or function to host; thus, if both directions are desired, then a function must have both an IN bulk-type endpoint and an OUT bulk-type endpoint or, alternatively, two pipes may be associated with the same endpoint. As examples of a bulk transfer, they may readily apply to data collection by scanner 26. Error detection is included in hardware and implements a limited number of retries for bulk data transfers so as to greatly enhance the likelihood of successful data delivery. However, a tradeoff for bulk data is that there is no guarantee against latency. Lastly, the amount of bandwidth per USB frame allotted to bulk data may vary depending on other bus demands arising from other data transfers by either the same or a different function.

Interrupt transfers are relatively small transfers to or from a USB function. Such data may be presented for transfer by a function at any time, but because USB host 12 is a master it cannot be interrupted. Instead, USB host 12 periodically polls each function and, in response to a notification that interrupt data has been posted, USB host 12 retrieves the interrupt information. Interrupt data typically consists of event notification, characters, or coordinates that are organized as one or more bytes. For example, interrupt data may be presented by keyboard 18 or mouse 24 (or some other pointing device).

Isochronous data is continuous and real-time in creation, communication, and use. Isochronous transfers are unidirectional and, thus, can be only from host to function or function to host; thus, if both directions are desired, then a function must have both an IN isochronous-type endpoint and an OUT isochronous-type endpoint (or two pipes associated with the same endpoint). Timing-related information is implied by the steady rate at which isochronous data is received and transferred. Isochronous data must be delivered at the rate received to maintain its timing. Isochronous data also may be sensitive to delivery delays. For isochronous pipes, the bandwidth required is typically based upon the sampling characteristics of the associated function. The latency required is related to the buffering available at each endpoint. A typical example of isochronous data would be real-time video information received by modem 14. Due to its real-time nature, the delivery rate of isochronous data must be maintained or else drop-outs in the data stream will occur. Isochronous communications are not corrected such as by hardware retries, with the benefit being that timely delivery is ensured (assuming no other latency, such as in software) while the drawback being that data communication may be lossy. In practice, the bit error rate of USB is predicted to be relatively small so that applications using the types of data being communicated as isochronous data are not appreciably affected in a negative manner. Lastly, USB isochronous data streams are allocated a dedicated portion of USB bandwidth to ensure that data can be delivered at the desired rate.

Figure 2:
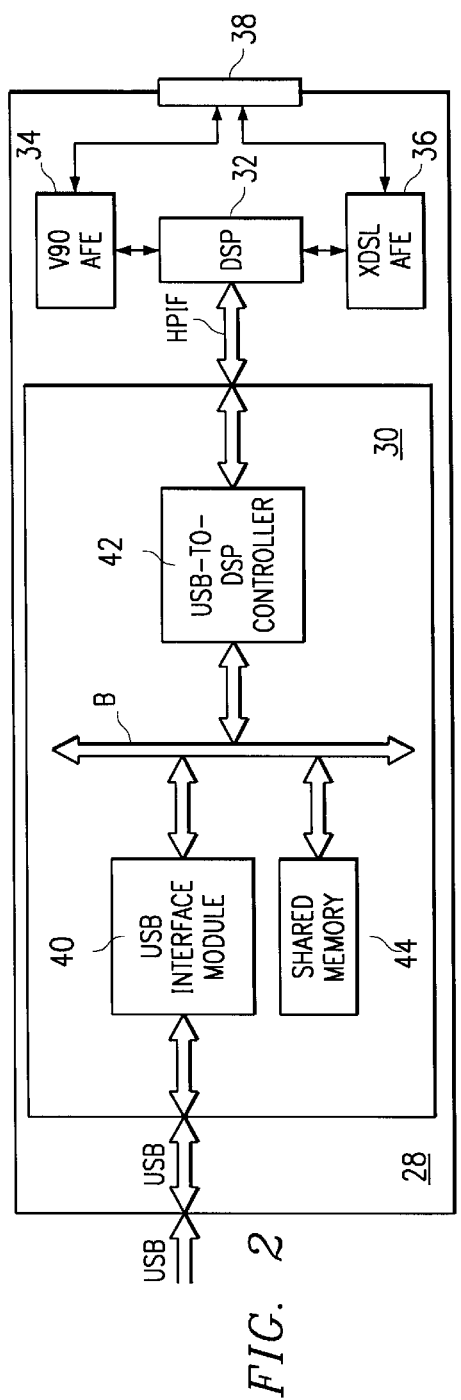
FIG. 2 illustrates a block diagram of a function card according to the preferred embodiment, where the function card provides various USB aspects and supports a hybrid modem function.

FIG. 2 illustrates a block diagram of a function card 28 according to the preferred embodiment. Function card 28 represents an electrical computer-type circuit board in general, and in FIG. 2 the blocks shown are those implemented in the preferred manner of forming modem 14 of FIGS. 1a and 1b; thus, function card 28 is intended to be enclosed within the external housing of modem 14 and connected electrically to the USB bus as known generally in the art. Further, while function card 28 includes various inventive aspects detailed below in the context of modem 14, one skilled in the art should appreciate that various of these aspects may apply to any one or more of the other functions in system 10. Lastly, by way of example and also for further introduction, in the preferred embodiment modem 14 is a hybrid modem serving both voice (e.g., V90) and xDSL communications.

Turning to certain connections of function card 28, to the left of FIG. 2 is shown the USB bus which, as introduced earlier, represents the two data conductors from a USB cable. In the present example of modem 14, therefore, the USB bus is the data conductors from cable $C_3$. The USB bus is coupled to a USB interface device 30 which, as detailed below, includes various other functional blocks that are formed using one or more integrated circuits. USB interface device 30 is further connected to an HPIF ("host port interface") bus which is further connected to a digital signal processor ("DSP") 32 or some other desirable processing circuit(s). By way of example, DSP 32 may be one of various types of DSPs commercially available from Texas Instruments Incorporated, such as the TMS320C6201, TMS320C6202, or TMS320C6205. Further with respect to these devices and bus HPIF coupling them to USB-to-DSP controller 42, the term "HPIF" in connection with bus HPIF is selected not as a limitation, but due to its association with the interface of the TMS320C6201 and TMS320C6202 (and TMS320C6205). Particularly, the interface of the TMS320C6201 is referred to in the art as a host port interface ("HPIF"), whereas the interface of the TMS320C6202 (and TMS320C6205) is referred to as an Xbus (extended bus). The Xbus supports various modes, one of which is a host port interface; thus, this optional mode may be selected to support the same HPIF as the TMS320C6201 and, for this reason, bus HPIF is named to reflect this mutual mode of the two DSPs. Further with respect to the interface of the TMS320C6x processors, note that the TMS320C6201 provides a 16-bit bus while the TMS320C6202 (and TMS320C6205) provides a 32-bit bus. The preferred embodiment may accommodate either such interface by including a user configurable switch to allow either a 16-bit or 32-bit coupling to the interface. In any event with respect to bus HPIF, a different bus name and type may be used with other DSP or processing circuits. Continuing with DSP 32, it is further connected to two different analog front end ("AFE") circuits, namely, a V90 (i.e., voice) AFE 34 and an xDSL AFE 36. Each AFE 34 and 36 is connected to a physical connector 38 so that an appropriate cable (not shown) may connect function card 28 to a proper connection to support modem communications. Returning to USB interface device 30 and examining the blocks shown therein, the USB bus connects within USB interface device 30 to a USB interface module 40. USB interface module 40 is further-connected to a bus B. Also connected to bus B is a USB-to-DSP controller 42, which is further connected to bus HPIF. Lastly, USB interface device 30 includes a shared memory 44 connected to bus B, and that is given its name because it is accessible by both USB interface module 40 and USB-to-DSP controller 42 via bus B. Further in this regard, shared memory 44 includes various locations reserved as USB endpoints, as detailed later.

A brief description of the operation of function card 28 is now presented, with further details presented later in connection with a more detailed examination of certain of the blocks shown therein. In general, function card 28 interfaces at both the physical and protocol levels with the USB system and, hence, permits communications between function card 28 and USB host 12. USB host 12 communicates data along the USB bus to function card 28, and that information is received by USB interface module 40 and processed according to principles known in the USB art. Further, USB interface module 40 may write transfers of any of the four above-described types to the endpoints in shared memory 44, where such information is written via bus B. USB-to-DSP controller 42 also may access the endpoints in shared memory 44 via bus B. Accordingly, given this access, data written to the endpoints from USB interface module 40 may be read by DSP 32 via bus HPIF or, alternatively, data written by DSP 32 to bus HPIF may be transferred by USB-to-DSP controller 42 to the endpoints in shared memory 44. Further in this regard, DSP 32 is programmed and configured to provide the general functionality supported as a USB function which, for the present example, is a modem functionality given that card 28 is associated with modem 14. Moreover, DSP 32 is programmed in this respect to support both voice and xDSL communications, and the two AFEs 34 and 36 provide electrical interfaces to and from DSP 32 further in this regard. DSP 32 also may be programmed to communicate with respect to USB-to-DSP controller 42 in various manners according to the preferred embodiments, as is discussed below.

Figure 3:
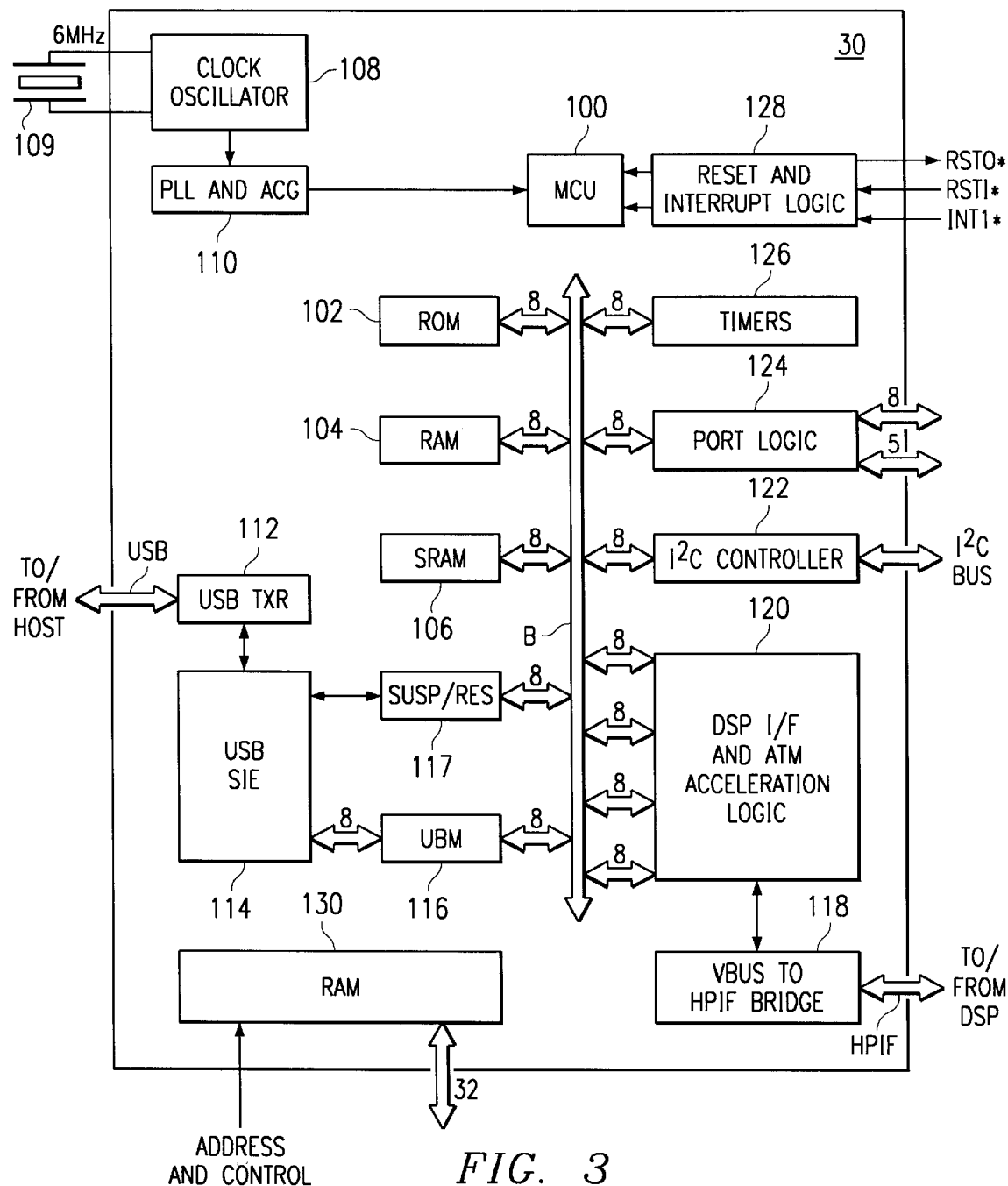
FIG. 3 illustrates the USB interface device 30 of FIG. 2 in greater detail.

Referring now to FIG. 3, an exemplary architecture of USB interface device 30 in modem 14 of FIG. 2, according to the preferred embodiment, is now described. Of course, USB interface device 30 may be constructed according to any one of a number of architectures and arrangements. As such, it is to be understood that the exemplary architecture illustrated in FIG. 3 and described herein is presented by way of example only.

USB interface device 30 of FIG. 3 includes functions similar to those provided by the TUSB3202 USB peripheral interface devices available from Texas Instruments Incorporated, and includes some common architectural features therewith. In this regard, USB interface device 30 includes microcontroller unit ("MCU") 100, which may be a standard 8052 microcontroller core. MCU 100 communicates with various memory resources over bus B, including program read-only memory ("ROM") 102, and random access memory ("RAM") banks 104, 106. RAM bank 104 is utilized primarily as code space that may be loaded from USB host 12 over the USB bus, or alternatively from another device over another one of the ports provided in USB interface device 30. As will be described in further detail below, synchronous RAM bank 106 ("SRAM 106") represents shared memory 44 from FIG. 2 and, thus, includes the USB endpoint buffers (although additional endpoints also may exist in RAM 104). MCU 100, as well as the other synchronous functions of USB interface device 30, are clocked at the appropriate clock rates by phase-locked loop ("PLL") and adaptive clock generator ("ACG") 110, which generates various frequencies divided down from a reference clock generated by oscillator 108 according to the frequency set by external crystal 109. PLL and ACG 110 preferably provide clocks suitable for supporting the available USB synchronization modes, including asynchronous, synchronous, and adaptive modes for isochronous endpoints.

For USB communications with USB host 12, USB interface device 30 includes USB transceiver 112, which preferably supports full speed (12 Mb/sec) data transfers, and includes a differential input receiver, a differential output driver, and two single ended input buffers. USB transceiver 112 is coupled to USB serial interface engine ("SIE") 114, which manages the USB packet protocol requirements for data transmitted and received by USB interface device 30 over the USB bus. In general, SIE 114 decodes packets received over the USB bus to validate and identify the packet identifier ("PID"), and generates the correct PID for packets to be transmitted over the USB bus. Other receive functions performed by SIE 114 include cyclic redundancy check ("CRC") verification, and serial-to-parallel conversion; for transmit, SIE 114 generates the CRC value and also effects parallel-to-serial conversion. SIE 114 bidirectionally communicates with USB buffer manager ("UBM") 116, which controls reads and writes of data from and to the appropriate USB endpoint buffers in RAM 104, 106. In this regard, UBM 116 decodes the USB function address in received packets to determine whether the packet is in fact addressed to USB interface device 30 itself, as well as decoding the endpoint address contained in the received packet (which may include a polling packet from USB host 12). Suspend and resume logic 117 is also provided for detecting suspend and resume conditions on the USB bus, and for controlling SIE 114 accordingly.

Other various functions are also provided within USB interface device 30. Inter-IC ($I^2C$) controller 122 is coupled to bus B, and supports communications to and from other integrated circuits over a two-wire serial connection; for example, RAM 104 may be loaded from such an external integrated circuit over the $I^2C$ port, under the control of $I^2C$ controller 122. General purpose port logic 124 interfaces bus B to general purpose parallel input/output ports, numbering two in this example. Timers 126 provide one or more timer functions for controlling the operation of USB interface device 130. Reset and interrupt logic 128 monitors various interrupt and reset conditions, to provide interrupt and reset control for MCU 100. Additionally, extra internal memory is provided by asynchronous RAM 130, which is externally accessible, for example to DSP 32 by way of a dedicated RAM interface (and thus permitting reads and writes in a manner independently from and asynchronously with the USB functionality of USB interface device 30).

In addition to the USB interface functions described above, which are substantially common with the TUSB3202 USB peripheral interface devices available from Texas Instruments Incorporated, USB interface device 30 according to the preferred embodiment includes DSP interface and ATM acceleration logic 120, for processing data received from USB host 12 over the USB bus for application to DSP 32 by way of VBUS-to-HPIF bridge 118, and for conversely processing data received from DSP 32 before transmission to USB host 12 over the USB bus. The construction and operation of DSP interface and ATM acceleration logic 120 will be described in further detail below. VBUS-to-HPIF bridge 118 supports reads and writes to on-chip memory of DSP 32 in either a sixteen bit or thirty-two bit mode.

Figure 4:
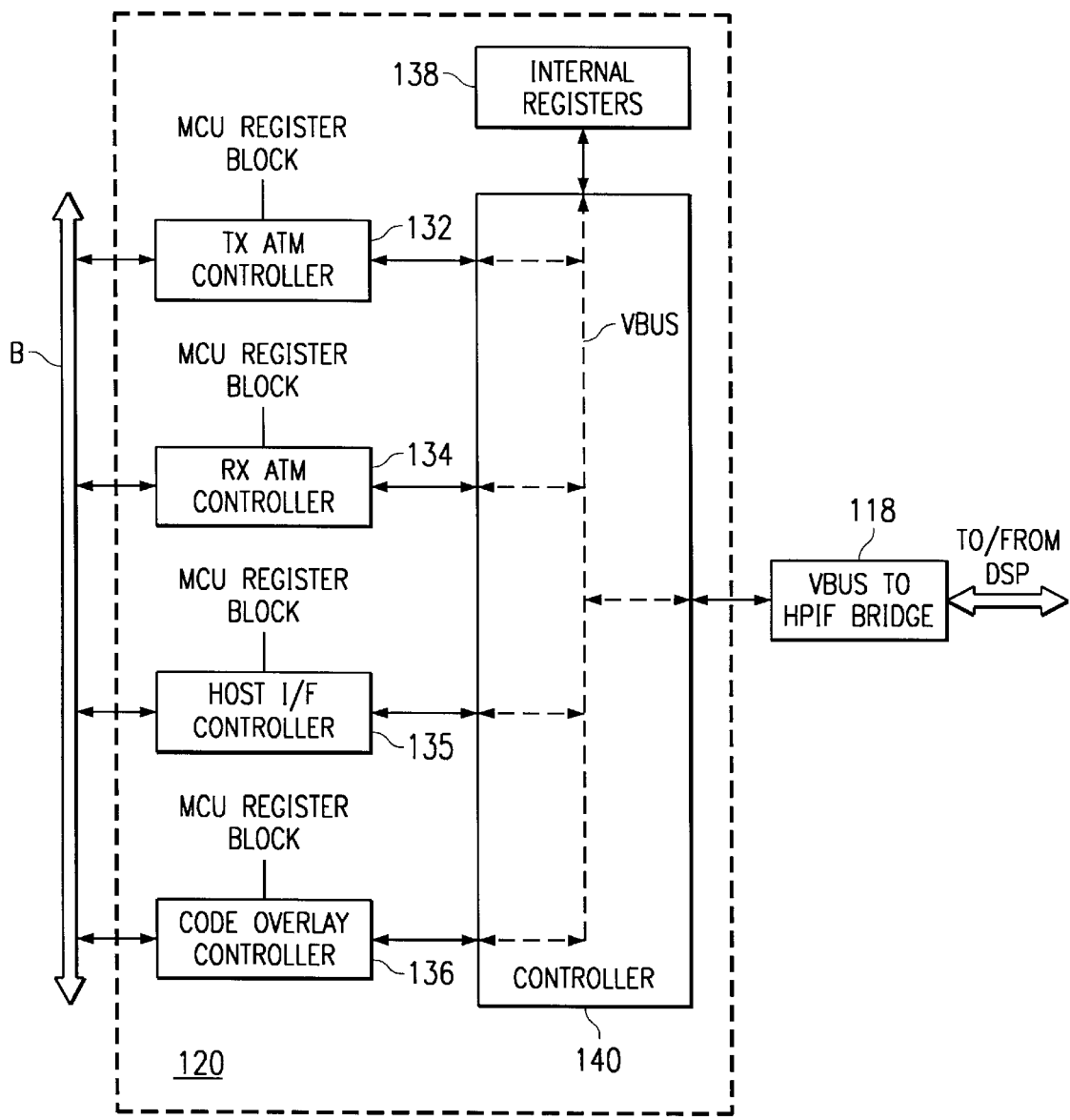
FIG. 4 illustrates the DSP interface and ATM Acceleration logic 120 of FIG. 3 in greater detail.

Referring now to FIG. 4, the construction of DSP interface and ATM acceleration logic 120 according to the preferred embodiment are now described. As shown in FIG. 4, multiple controllers within DSP interface and ATM acceleration logic 120 are coupled to bus B (FIG. 3). According to this embodiment, in which USB interface device 30 is implemented into modem 14, DSP interface and ATM acceleration logic 120 includes ATM transmit controller 132 and ATM receive controller 134, each of which is unidirectionally coupled to pass data from bus B to controller 140, and is utilized to carry out ATM communications processing, including such functions as segmentation and reassembly, respectively. Host interface controller 135 is bidirectionally coupled between bus B and controller 140, while code overlay controller 136 unidirectionally communicates data (corresponding to program instructions for DSP 32) from bus B to controller 140. Each of controllers 132, 134, 135, 136 also may communicate handshake signals between bus B and the respective controller. Further, according to the preferred embodiment, each of controllers 132, 134, 135, 136 includes an interface to MCU 100 (FIG. 3), by way of which controllers 132, 134, 135, 136 are configured to point to the corresponding assigned USB endpoint buffers in SRAM 106.

Controller 140 arbitrates access by controllers 132, 134, 135, 136 to bus VBUS (which appears as a "virtual" bus to devices external to USB interface device 30), and further permits access to the slaves to bus VBUS which consist of VBUS-to-HPIF bridge 118 and internal registers 138. Specifically, in response to one of controllers 132, 134, 135, 136 issuing a request to master bus VBUS, controller 140 operates to grant access to bus VBUS according to a corresponding bus protocol, after arbitration among competing bus requests. Further, internal registers 138 communicate with controller 140, as a slave on bus VBUS, for storing configuration information for DSP interface and ATM acceleration logic 120 and its functional modules. As noted above, endpoint buffer information is preferably configured internally to each of controllers 132, 134, 135, 136; the configuration information stored by internal registers 138 includes such other configuration and status information as appropriate for the operation of DSP interface and ATM acceleration logic 120.

VBUS-to-HPIF bridge 118 operates effectively as a bridge between the bus connected to DSP 32 and internal bus VBUS which, as noted above, is accessible to controllers 132, 134, 135, 136. For example, if the interface from USB interface device 30 to DSP 32 is by way of its host-port interface (HPIF), such as incorporated into the TMS320C6201 digital signal processor (DSP) available from Texas Instruments Incorporated, VBUS-to-HPIF bridge 118 operates effectively as a bridge to that interface, formatting and translating the communicated data signals from those on bus VBUS into a format appropriate for the bus protocol of the host-port interface.

Figure 5:
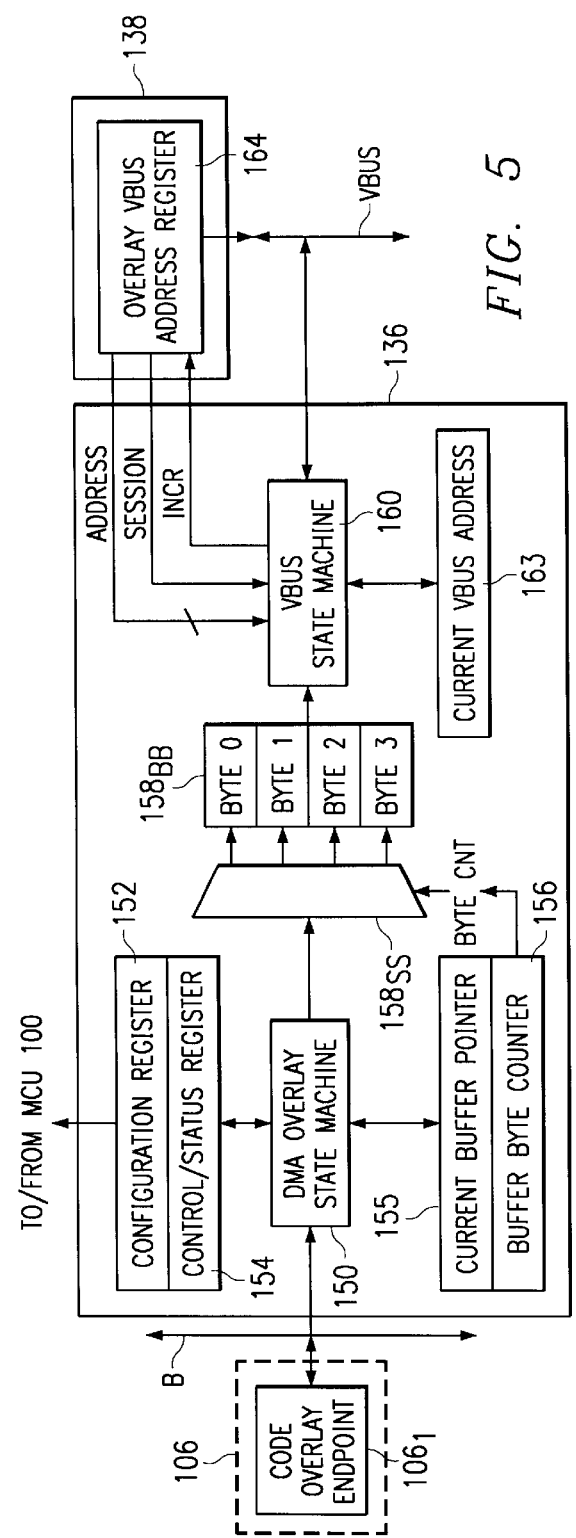
FIG. 5 illustrates the host code overlay controller 136 of FIG. 4 in greater detail.

FIG. 5 illustrates a block diagram of code overlay controller 136 in greater detail, and further demonstrates particular aspects of the preferred embodiment. In general, code overlay controller 136 serves as a program code overlay interface between USB host 12 and DSP 32, that is, it permits USB host 12 to supply a code overlay operation to the memory space of DSP 32 which is accessible via bus VBUS. Further in this regard and as detailed below, code overlay controller 136 services a dedicated endpoint in shared memory 44 (FIG. 2, or SRAM 106 of FIG. 3), and which is accessible via bus B, where such access permits the efficient and expeditious transfer of program code so as to reduce the required memory space of DSP 32 to accommodate such code.

Turning to a first block in FIG. 5, code overlay controller 136 includes a DMA overlay state machine 150 which is coupled to receive, from MCU 100, a configuration register 152. In the preferred embodiment, the configuration information in register 152 comprises: (1) an enable bit; and (2) an endpoint descriptor block pointer. The enable bit, when set to an enable state, enables the functionality of DMA overlay state machine 150. The endpoint descriptor block pointer in the present embodiment points to an address location in shared memory SRAM 106, where the address location is the beginning of an endpoint descriptor block, as further detailed below. DMA overlay state machine 150 is also coupled to provide, to MCU 100, one or more bits in a control/status register 154, where these bits permit DMA overlay state machine 150 to inform or possibly interrupt MCU 100 if desired (e.g., if some type of data fault or exception occurs).

DMA overlay state machine 150 is also coupled to bus B, thereby permitting access between it and a dedicated code overlay endpoint $106_1$ within SRAM 106 (FIG. 3, or shared memory 44 of FIG. 2). More particularly, at initial configuration DMA overlay state machine 150 reads the endpoint descriptor block pointer from configuration register 152, and then DMA overlay state machine 150 reads the endpoint descriptor block at the pointer address. Further in this regard, the endpoint descriptor block read at the pointer address in SRAM 106 identifies various attributes about code overlay endpoint $106_1$, including the address location of each of two buffers (i.e., an X and Y buffer) of the endpoint, the total storage capacity of the endpoint, and the number of valid data bytes, if any, stored in each buffer of the endpoint. In the preferred embodiment, code overlay endpoint $106_1$ is a 64-byte bulk-type endpoint, meaning up to 64 bytes may be written to one of its buffers in a given stream of bytes. Further, the 64-byte capacity of code overlay endpoint $106_1$ is duplicated by using the X and Y buffers, where each buffer can store up to 64 bytes. This dual-buffer structure, as detailed below, permits the writing of one such buffer at the same time the other buffer is being read. DMA overlay state machine 150 is also coupled to a current buffer pointer 155 and a buffer byte counter 156. Current buffer pointer 155 stores a pointer corresponding to code overlay endpoint $106_1$, where the pointer may point to either the X or Y buffer for endpoint $106_1$. Buffer byte counter 155 is for tracking the number of valid bytes copied from either the X or Y buffer of code overlay endpoint $106_1$, as further detailed later.

Code overlay controller 136 also includes a code byte buffer $158_{BB}$, which is connected to a respective selection circuit $158_{SS}$. Code byte buffer $158_{BB}$ is configured to store four bytes of code data at one time, where the code data is transferred to code byte buffer $158_{BB}$ from code overlay endpoint $106_1$ as discussed below. Further in this respect, selection circuit $158_{SS}$ has an input connected to an output of DMA overlay state machine 150, and buffer byte counter 156 provides a control signal, Byte Cnt, to selection circuit $158_{SS}$ so that the data at its input is connected to one of four outputs. Each of those four outputs is provided to a corresponding byte storage location in byte buffer $158_{BB}$.

Code overlay controller 136 also includes a VBUS state machine 160 coupled between byte code buffer $158_{BB}$ and bus VBUS. More particularly, the four output bytes of code byte buffer $158_{BB}$ are also connected as inputs to a VBUS state machine 160, and VBUS state machine 160 is coupled to pass data from these inputs to bus VBUS (with additional bi-directional control also able to pass between the two). Specifically in the preferred embodiment, VBUS state machine 160 includes one or more state machines for communicating code data from code byte buffer $158_{BB}$ to bus VBUS. Further in this regard, VBUS state machine 160 is bidirectionally connected to a current VBUS address register 163, which stores a copy of an address on bus VBUS to which a code word is written by VBUS state machine 160. Lastly, an overlay VBUS address register 164 is also coupled to bus VBUS, and is coupled to VBUS state machine 160 in three manners: (1) the address stored in overaly VBUS address register 164 is coupled as a signal ADDRESS to VBUS state machine 160; (2) a SESSION signal is coupled from overlay VBUS address register 164 to VBUS state machine 160 and is asserted when a new address is written to overlay VBUS address register 164; and (3) an increment signal INCR is coupled from VBUS state machine 160 to overlay VBUS address register 164 which, when asserted, causes an increment in the address stored by overlay VBUS address register 164.

The operation of code overlay controller 136 is now examined in greater detail, and is further explored below using additional Figures. At this point by way of introduction to such Figures, the operation is introduced as follows. Generally, DSP 32 provides a capability to USB host 12 and that capability defines the function of the device (e.g., modem 14). DSP 32 performs its capability according to program code accessible by DSP 32. In the present embodiment, at least a portion of this code is not permanent code, that is, it is temporarily stored in either an internal or external memory accessible by DSP 32 (hereafter referred to as "DSP 32 memory"). The code in the DSP 32 memory, therefore, may be overwritten by other code. More particularly as to the operation of code overlay controller 136 in this respect, it permits blocks of program code to be communicated dynamically, either at start-up and also at a time after start-up, from USB host 12 to code overlay controller 136, and then further to the DSP 32 memory via bus VBUS. Given this functionality, USB host 12 may communicate to the DSP 32 memory in a first instance only a portion or block of program code needed by DSP 32 to perform a first set of operations, while in a second and later instance USB host 12 may communicate to the DSP 32 memory a different block of program code, thereby overwriting some or all of the first-instance code and causing DSP 32 to perform a different and second set of operations. This overwriting aspect is sometimes referred to in other computing arts as "code overlay," that is, subsequent code is said to overlay earlier code. In the present embodiment, note that the code overlay aspect may be achieved after start-up and, hence, once DSP 32 is operating to provide one or more capabilities to USB host 12.

The preferred details of accomplishing the above-described code overlay operations are now explored in greater detail. At start-up, MCU 100 configures code overlay controller 136 (as well as controllers 132, 134, and 135), and in doing so MCU 100 enables DMA overlay state machine 150 by setting the enable bit in configuration register 152 (via MCU 100). Thereafter, and including times later than start-up, USB host 12 may begin a code overlay session, that is, a time instance where a block of new program code is communicated to the function, and where the new code will be fetched and executed by the processing circuitry of the function (e.g., DSP 32). To begin such a code overlay session according to the preferred embodiment, and prior to writing a block of code bytes to code overlay endpoint $106_1$, USB host 12 first writes a destination address to overlay VBUS address register 164. The destination address identifies the beginning address in the DSP 32 memory to which the first word of the block of code, which is later transmitted by USB host 12 to modem 14, is directed. In the preferred embodiment, this step is achieved by USB host 12 sending the destination address to host interface controller 135 (FIG. 4), and in response host interface controller 135 passes the destination address to overlay VBUS address register 164. Thereafter, USB host 12 transfers code data to either the X or Y buffer of code overlay endpoint $106_1$. Further, because code overlay endpoint $106_1$ is a bulk-type endpoint, then each transfer of code may be up to 64 bytes of code placed within a USB packet. The remaining operations with respect to the transfer of code may be understood by examining the operation of code overlay controller 136 in two contexts, the first associated with DMA overlay state machine 150 and described below with respect to FIG. 6, and the second associated with VBUS state machine 160 and described below with respect to FIG. 7.

Figures 6, 7:
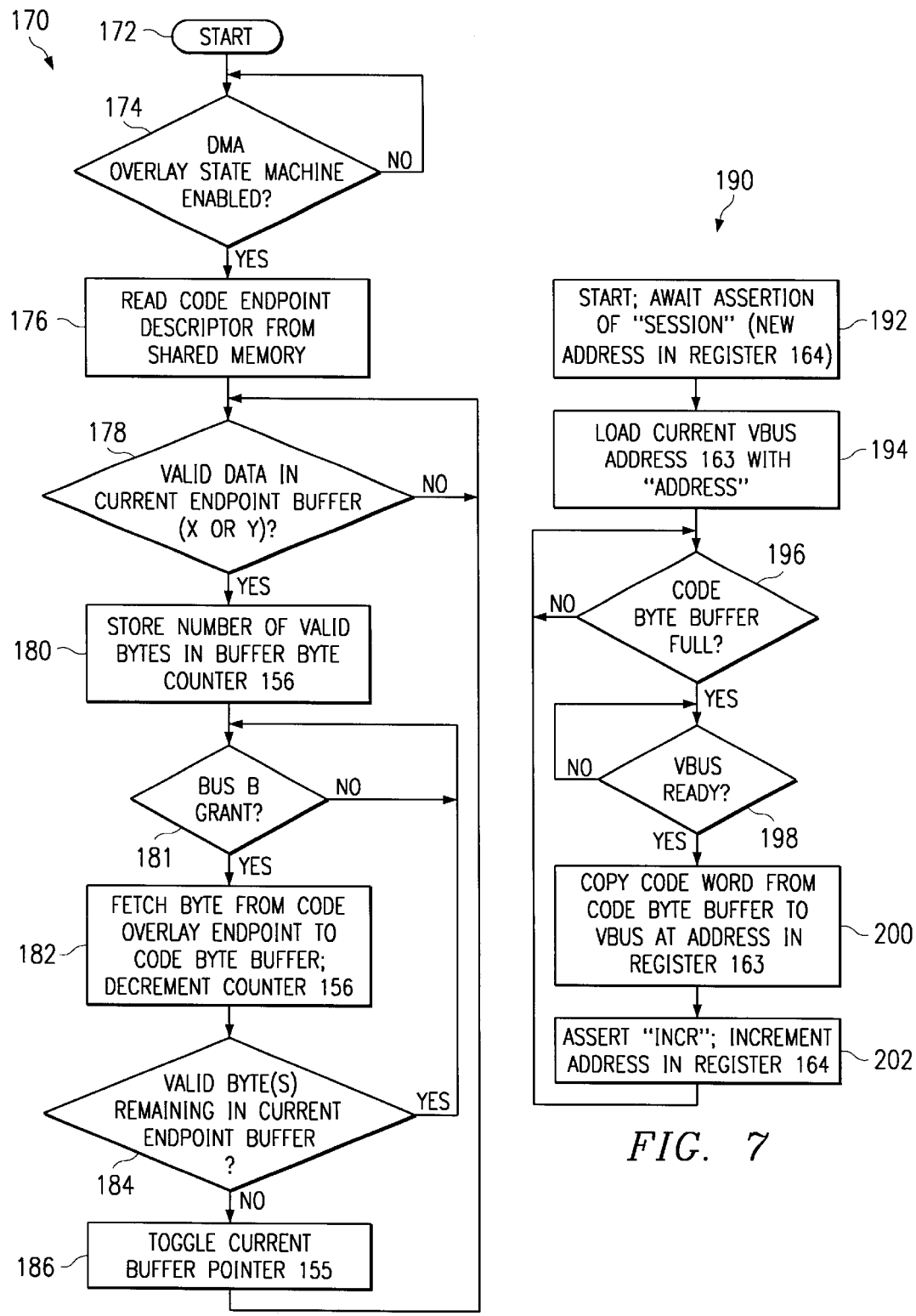
FIG. 6 illustrates a flow chart of a method of operation of overlay state machine 150 of FIG. 5.
FIG. 7 illustrates a flow chart of a method of operation of VBUS state machine 160 of FIG. 5.

FIG. 6 illustrates a flow chart of a method 170 of operation of DMA overlay state machine 150 from FIG. 5. Method 170 commences with a start step 172 which is the default state of DMA overlay state machine 150 upon attachment of the device including the state machine to the USB bus (or upon reset of the device). From step 172, method 170 continues to step 174 where DMA overlay state machine 150 determines whether it has been enabled. Recall from above that DMA overlay state machine 150 is enabled if MCU 100 sets the enable bit in configuration register 152 to an enabled state. If DMA overlay state machine 150 is not enabled, method 170 remains in a loop by returning to step 174 until it is enabled. Once DMA overlay state machine 150 is enabled, method 170 continues to step 176. In step 176 DMA overlay state machine 150 reads the endpoint descriptor block from shared memory (i.e., SRAM 106). Recall that the endpoint descriptor block includes the address of both the X and Y buffers of code overlay endpoint $106_1$, as well as the number of valid bytes, if any, in each of those buffers. Next, method 170 proceeds from step 176 to step 178.

Prior to discussing step 178 and subsequent steps, note that once DMA overlay state machine 150 is enabled, generally DMA overlay state machine 150 governs code data transactions without further intervention from MCU 100. In this manner, therefore, in the preferred embodiment these and related aspects described below are not implemented within or otherwise accommodated by MCU 100. As a result, the preferred embodiment does not unduly complicate MCU 100 or require additional hardware therein.

Step 178 determines whether there is valid data in the current buffer for code overlay endpoint $106_1$. To achieve this step, recall that current buffer pointer 155 indicates one of either the X or Y buffer. For an example, assume when step 178 is reached a first time, that current buffer pointer 155 indicates the X buffer of code overlay endpoint $106_1$. Accordingly, step 178 determines whether there is valid data in the X buffer. Further, this determination is made by reading a register written by UBM 116 which includes an indication of the valid number of bytes in each buffer. If no valid data exists in the current buffer (e.g., the X buffer), then method 170 repeats step 178 where the register containing the number of valid data bytes, if any, is again read. Thus, in this repeated instance, 178 again determines if by that time valid data has now been placed in the current buffer (e.g., X buffer). One skilled in the art will therefore appreciate that this circular flow repeats until valid data is stored in the current buffer of code overlay endpoint $106_1$, at which time method 170 continues from step 178 to step 180.

Step 180 stores into buffer byte counter 156 the number of valid bytes in the current buffer, where again that buffer is indicated by current buffer pointer 155. Thus, continuing with the preceding example, in a first instance of step 180 the number of valid bytes in the X buffer of code overlay endpoint $106_1$ is stored in buffer byte counter 156. Next, method 170 continues from step 180 to step 181.

Step 181 acts as a wait state for DMA overlay state machine 150 until it receives a grant to access bus B, where the access is sought so that code data may be fetched using that bus and from dedicated code overlay endpoint $106_1$. If no grant is currently given for bus B, then DMA overlay state machine 150 remains in a loop by returning to step 181 until a grant to bus B is given. In response to the bus B grant, method 170 continues from step 181 to step 182.

In step 182, DMA overlay state machine 150 performs a DMA access of a valid code byte from the current buffer (e.g., X buffer) of code overlay endpoint $106_1$ to code byte buffer $158_{BB}$. Further with respect to this transfer, the count number in buffer byte counter 156 provides a basis to output the value Byte Cnt so that the first transferred byte to selection circuit $158_{SS}$ is provided to a first location in code byte buffer $158_{BB}$. Step 182 also decrements the value in buffer byte counter 156. Next, method 170 continues from step 182 to step 184.

In step 184, DMA overlay state machine 150 determines whether there is another valid byte remaining in the current buffer of code overlay endpoint $106_1$. This determination may be made, by way of example, by examining whether the count in buffer byte counter 156 has reached zero. If at least one more valid byte remains in the current buffer of code overlay endpoint $106_1$, then method 170 returns from step 184 to step 181. As a result, a circular flow occurs between steps 181 through step 184 until all valid bytes from a given buffer in overlay endpoint $106_1$ are fetched from that buffer and stored to code byte buffer $158_{BB}$. Since step 182 decrements buffer byte counter 156 for each of these fetch operations, then once all such valid bytes are fetched, the count in counter 156 equals zero and step 184 therefore determines that all valid bytes have been fetched from the current buffer. At that point, method 170 continues from step 184 to step 186.

The above-described process for the DMA transfer of step 180 may continue for up to 64 bytes sent by USB host 12 to overlay endpoint $106_1$ in a single USB packet, with the following additional observations for such potential transfers. First, once four code bytes (i.e., one 32-bit code word) have been copied to code byte buffer $158_{BB}$, then VBUS state machine 160 times its input from code byte buffer $158_{BB}$, and as detailed below, to ensure that the 32-bit code word is timely read from code byte buffer $158_{BB}$ and communicated to bus VBUS. Second, the writing to code byte buffer $158_{BB}$ is in a circular fashion, whereby the changing count in buffer byte counter 156 may be used as a basis to properly advance Byte Cnt so that selection circuit $158_{SS}$ sequentially directs each new code byte to the least-recently used storage location of byte buffer $158_{BB}$. Third, due to the use of both an X and Y buffer with code overlay endpoint $106_1$, at the same time that DMA overlay state machine 150 is copying code bytes from one of those buffers (e.g., the X buffer), then USB host 12 may write additional code bytes to the other of those buffers (e.g., the Y buffer).

In step 186, DMA overlay state machine 150 toggles the indicator in current buffer pointer 155 SO that it switches its buffer identification (as between the X or Y buffer) from that buffer from which code data was just copied. For example, the preceding discussed code fetches from the X buffer of code overlay endpoint $106_1$ and, after that example, then step 186 toggles the value in current buffer pointer 155 to indicate the Y buffer of overlay endpoint $106_1$.

After step 186, method 170 returns to step 178, and that step and following steps are directed to perform data fetches from the Y buffer, assuming valid data has been transferred to that buffer. Specifically, the return to step 178 causes DMA overlay state machine 150 to read the register that indicates the number of valid data bytes in the Y buffer. Thereafter, method 170 continues to step 180 (assuming there is valid data in the Y buffer) and following steps, and one skilled in the art will therefore appreciate from the preceding discussion of those steps that up to 64 bytes, one at a time, now may be fetched from the Y buffer, where those bytes are presented to code byte buffer $158_{BB}$ and removed from that buffer in one word groupings, where the removal process is further detailed immediately below in connection with FIG. 7.

FIG. 7 illustrates a flow chart of a method 190 of operation of VBUS state machine 160 from FIG. 5. By way of introduction, the illustration of FIG. 7 is directed to the relationship of VBUS state machine 160 and its performing code data transfers from code byte buffer $158_{BB}$ to bus VBUS (and the DSP 32 memory coupled thereto). Also, recall it was noted earlier that VBUS state machine 160 may actually comprise more than one machine in implementation; for example, a first state machine may interface with code byte buffer $158_{BB}$, while a second state machine, in communication with the first state machine, may interface and arbitrate with bus VBUS. To simplify the remaining discussion, however, the operation is described as an overall single state machine while one skilled in the art may readily ascertain additional details that arise from implementing separate state machines.

Method 190 commences with a start step 192 which is the default state of VBUS state machine 160 upon attachment of the device including the state machine to the USB bus (or upon reset of the device), and is also a state to which 160 may return as now described. During step 192, VBUS state machine 160 awaits the assertions of the SESSION signal, which recall is asserted when a new address is written in overlay VBUS address register 164; thus, only once USB host 12 writes a new address to VBUS address register 164 and SESSION is asserted in response thereto, then method 190 continues from step 192 to step 194. As appreciated in greater detail later, if, during the operation of later steps in method 190, USB host 12 writes a new address to overlay VBUS address register 164, then VBUS state machine 160 will complete its current transfer and then return again to step 194 for a different transfer.

In step 194, VBUS state machine 160 initializes a value that is later adjusted to track the transfer of code data from code byte buffer $158_{BB}$ to bus VBUS. Specifically, in step 194 the ADDRESS from overlay VBUS address register 164 is copied into current VBUS address register 163. Next, method 190 continues from step 194 to step 196.

In step 196, VBUS state machine 160 determines whether code byte buffer $158_{BB}$ is filled with valid code data, that is, whether an entire code word (i.e., four code bytes) has been transferred from code overlay endpoint $106_1$ to code byte buffer $158_{BB}$. Since code byte buffer $158_{BB}$ is written in a circular fashion, then the determination may be evaluated by examining a valid flag associated with the last of the four bytes storage elements of code byte buffer $158_{BB}$, thereby finding the condition satisfied once the flag indicates valid data. If the determination is not satisfied, then method 190 returns to step 196 in a circular fashion until a full code word has been stored into code byte buffer $158_{BB}$, at which time method 190 continues from step 196 to step 198.

Step 198 is a wait state for VBUS state machine 160 until it receives a grant to access bus VBUS, where the access is sought so that code data may be communicated to that bus and from which DSP 32 may ultimately have access to that code data. If no grant is currently given for bus VBUS, then VBUS state machine 160 remains in a loop by returning to step 198 until a grant to bus VBUS is given. In response to the bus VBUS grant, method 190 continues from step 198 to step 200.

In step 200, VBUS state machine 160 writes the current code word (i.e., four code bytes) from code byte buffer $158_{BB}$ to bus VBUS. Further, this write is directed to the address in current VBUS address register 163; in this regard, recall that step 194, discussed above, initially writes into current VBUS address register 163 the address provided by USB host 12 to overlay VBUS address register 164. Thus, for the first word of code data in a block of data in code overlay endpoint $106_1$, and having been transferred to code byte buffer $158_{BB}$, the word is written to the bus VBUS address as provided by USB host 12. Further this data may then be communicated to the DSP 32 memory via VBUS-to-HPIF bridge 118 (FIG. 4). Next, method 190 continues from step 200 to step 202.

In step 202, DMA overlay state machine 150 alters stored values in preparation for the next write of a code word. Specifically, step 202 asserts the INCR signal to overlay VBUS address register 164, and in response to that assertion the address stored in VBUS address register 164 is incremented. Additionally, DMA overlay state machine 150 increments the address in current VBUS address register 163. Next, method 190 returns from step 202 to step 196.

When step 196 is reached a subsequent time, it proceeds as discussed earlier. One skilled in the art will therefore appreciate that the changed value from step 202 permit the next code word to be written to bus VBUS once step 196 is again satisfied. For example, assume that after a first code word is written to bus VBUS by a first instance of step 200, and then the return to step 196 begins the process of writing a second code word (assuming at least two code words were written by USB host 12 to code overlay endpoint $106_1$). Thus, when code byte buffer $158_{BB}$ is filled with the second code word, and after a grant of bus VBUS is given to VBUS state machine 160, then the second code word is written to bus VBUS, and the write is to the bus VBUS address in overlay VBUS address register 164, which was earlier incremented to identify the address location immediately following the address location to which the first code word was written.

Given the preceding, the above-described process may repeat theoretically for an unlimited number of code bytes (subject to memory size limitations), where the beginning address to which the first of those code words is written is the address written by USB host 12 to overlay VBUS address register 164. Further, when USB host 12 seeks to write additional code data to code overlay controller 136, then it will write a new address to overlay bus address register 164 which, as discussed earlier, causes an assertion of the SESSION signal and a return of method 190 to the start step 192. Finally, while not explicitly shown, note in the preferred embodiment that VBUS state machine 160 is also coupled to be interrupted under control of host interface controller 135, and using this mechanism DSP 32 can suspend any additional transfers by code overlay controller 136 until DSP 32 later notifies code overlay controller 136 that it may resume.

Having detailed various aspects of the preferred embodiment, some additional observations may be made in connection with the preferred embodiments.

A first additional observation arises from the ability of the preferred embodiment to have a USB host 12 direct blocks of code data to specified address locations in the DSP 32 memory. This approach permits USB host 12 to provide blocks of code data to the DSP 32 memory (via code overlay endpoint $106_1$ and code overlay controller 136), where a code block transmitted in a second instance may overwrite (or "overlay") a portion of a code block transmitted in a first instance. For example in the case of hybrid modem 14, a first block of code may be written by USB host 12 to the DSP 32 memory so that DSP 32 can perform modem training operations, followed by a second write by USB host 12 to the DSP memory of a second block of code so that DSP 32 can perform actual modem data communications. The ability to swap code in this manner reduces the capacity requirements for the DSP 32 memory and provides for efficient memory management. In other words, under the prior art where both the first block and second block are communicated to the function in a single download at start-up, then a certain memory capacity is required to accommodate both blocks; however, under the preferred embodiment, a smaller memory may be used where its capacity need only be large enough to accommodate the largest single block that will be provided to it using the overlay functionality. Thus, the device complexity and cost otherwise required in connection with program storage capacity for DSP 32 are reduced. Moreover, the need for external program memory can be eliminated, and the on-chip program memory requirement can be minimized.

A second additional observation arises from the ability of the preferred embodiment to permit code overlay writes to be to locations in the DSP 32 memory that are either contiguous or non-contiguous. Additionally, because each download session commences by USB host 12 writing an address to overlay VBUS address register 164, then it is recommended that USB host 12 poll that register prior to beginning a new session to ensure that the previous session has been complete. Once USB host 12 does ensure that a previous session has been complete, then USB host 12 can commence a new code overlay session at a different (or the same) address at which the previous session commenced. This new session is started by USB host 12 writing the destination address of the next code block to overlay VBUS address register 164.

A third additional observation in connection with the preferred embodiment arises in that the code overlay transfer function may be achieved using a reasonable number of circuit gates and preferably in a manner so as not to appreciably affect a separate USB controller (e.g., MCU 100).

A fourth additional observation is that the preferred embodiment implementation of a dedicated OUT endpoint for code overlay endpoint 106$_1$ of a bulk-type supports up to 64-byte USB packets. Further, under the USB Specification many bulk packets may be communicated per a USB 1 millisecond frame, and therefore the preferred embodiment permits theoretical code overlay data rates in excess of 6 Mbps. Such a rate, even if reduced for an implementation in a lightly to moderately loaded USB system, is more than sufficient to support code overlay for various functions, including that of the hybrid modem capability provided by modem 14. For example, the code overlay implementation in the hybrid mode supports a transfer of a first code block to modem 14 for purposes of modem training followed later by a second code block to modem 14 to support so-called show time operations.

A fifth additional observation is while the present embodiments have been described in detail, various substitutions, modifications or alterations could be made to the descriptions set forth above, as has been suggested further by various examples. Indeed, the present teachings may be expanded further by other variations thereto. For example, while the dedicated code overlay endpoint 106$_1$ has been shown as preferably a bulk-type endpoint, it alternatively could be an isochronous-type endpoint, although a trade-off arises in the limitations imposed by the USB Specification on the number of bytes that may be communicated per frame of an isochronous-type. As yet another example, while code overlay controller 136 and function card 28 have been shown by way of example as associated with modem 14, these same or comparable devices may be used with other USB functions in system 10, or still others not shown. Finally, still other examples will be ascertainable by one skilled in the art and, thus, the preceding has generally set forth the present preferred embodiments, but such other changes may be made thereto without departing from the inventive scope which is defined by the following claims.

What is claimed is:

1. A USB function device for coupling to a USB host, comprising:
   circuitry for providing a capability to the USB host, and comprising processing circuitry having an address space; and
   a USB interface circuit coupled between the USB host and the circuitry for providing a capability to the USB host, the USB interface circuit comprising:
      a memory area comprising a code overlay endpoint accessible to the USB host for writing two or more code blocks to the code overlay endpoint; and
      circuitry for communicating a first of the code blocks from the code overlay endpoint to the address space and for subsequently communicating a second of the code blocks from the code overlay endpoint to the address space, wherein the circuitry for communicating is operable to communicate a code block from the code overlay endpoint to the address space after a start-up time of the USB function device.

2. The USB function device of claim 1 wherein the USB interface circuit further comprises an address register for storing a specified address identifying a location in the address space, wherein the circuitry for communicating is operable to communicate a code block from the code overlay endpoint to a location in the address space beginning with the specified address.

3. The USB function device of claim 2:
   wherein the circuitry for communicating is operable to communicate the first code block from the code overlay endpoint to a location in the address space beginning with a first specified address;
   wherein the circuitry for communicating is operable to communicate the second code block from the code overlay endpoint to a location in the address space beginning with a second specified address; and
   wherein the first specified address is the same as the second specified address.

4. The USB function device of claim 2:
   wherein the circuitry for communicating is operable to communicate the first code block from the code overlay endpoint to a location in the address space beginning with a first specified address;
   wherein the circuitry for communicating is operable to communicate the second code block from the code overlay endpoint to a location in the address space beginning with a second specified address; and
   wherein the first specified address is different than the second specified address.

5. The USB function device of claim 4 wherein the address register is coupled to receive the address from the USB host.

6. The USB function device of claim 5 wherein the circuitry for communicating communicates each of the code blocks from the code overlay endpoint to the address space in response to the address register receiving an address corresponding to each of the code blocks.

7. The USB function device of claim 6 and wherein the circuitry for communicating comprises:
   a data buffer; and
   a DMA circuit for performing a DMA access of the plurality of code bytes from the memory area to the data buffer.

8. The USB function device of claim 7 and wherein the circuitry for communicating further comprises a state machine coupled between the data buffer circuit and a bus coupled to the address space.

9. The USB function device of claim 8 wherein the state machine is operable to arbitrate access to the bus coupled to the address space.

10. The USB function device of claim 7 wherein the code overlay endpoint comprises a bulk-type endpoint.

11. The USB function device of claim 10 wherein the code overlay endpoint comprises a 64 byte endpoint.

12. The USB function device of claim 1 wherein the code overlay endpoint comprises a bulk-type endpoint.

13. The USB function device of claim 12 wherein the code overlay endpoint comprises a 64 byte endpoint.

14. The USB function device of claim 1 wherein the code overlay endpoint comprises an isochronous-type endpoint.

15. The USB function device of claim 1:
   wherein the USB interface circuit further comprises an address register for storing a specified address identifying a location in the address space;
   wherein the circuitry for communicating is operable to communicate a code block from the code overlay endpoint to a location in the address space beginning with the specified address; and
   wherein the circuitry for communicating communicates each of the code blocks from the code overlay endpoint to the address space in response to the address register receiving an address corresponding to each of the code blocks.

16. The USB function device of claim 15 wherein the code overlay endpoint comprises a bulk-type endpoint.

17. The USB function device of claim 1 and wherein the circuitry for communicating comprises:
   a data buffer; and
   a DMA circuit for performing a DMA access of the plurality of code bytes from the memory area to the data buffer.

18. The USB function device of claim 17 and wherein the circuitry for communicating further comprises a state machine coupled between the data buffer circuit and a bus coupled to the address space.

19. A USB system, comprising:
   a USB host;
   a plurality of function devices for coupling to the USB host, wherein at least one of the plurality of function devices comprises:
      circuitry for providing a capability to the USB host, and comprising processing circuitry having an address space; and
      a USB interface circuit coupled between the USB host and the circuitry for providing a capability to the USB host, the USB interface circuit comprising:
         a memory area comprising a code overlay endpoint accessible to the USB host for writing two or more code blocks to the code overlay endpoint; and
         circuitry for communicating a first of the code blocks from the code overlay endpoint to the address space and for subsequently communicating a second of the code blocks from the code overlay endpoint to the address space, wherein the circuitry for communicating is operable to communicate a code block from the code overlay endpoint to the address space after a start-up time of the USB function device.

20. The USB system of claim 19 wherein the USB interface circuit further comprises an address register for storing a specified address identifying a location in the address space, wherein the circuitry for communicating is operable to communicate a code block from the code overlay endpoint to a location in the address space beginning with the specified address.

21. The USB system of claim 20 wherein the address register is coupled to receive the address from the USB host.

22. The USB system of claim 21 wherein the circuitry for communicating communicates each of the code blocks from the code overlay endpoint to the address space in response to the address register receiving an address corresponding to each of the code blocks.

23. The USB system of claim 22 wherein the code overlay endpoint comprises a bulk-type endpoint.

24. The USB system of claim 19 wherein the code overlay endpoint comprises a bulk-type endpoint.

25. A method of operating a USB function device to communicate with a USB host, the USB function device comprising circuitry for providing a capability to the USB host wherein the circuitry for providing a capability has processing circuitry having an address space, the method comprising the steps of:
   receiving into a code overlay endpoint a first code block comprising a plurality of code bytes from the USB host;
   copying the first code block into a first location in the address space, the first location commencing with a first address;
   receiving into the code overlay endpoint a second code block comprising a plurality of code bytes from the USB host; and
   copying the second code block into a second location in the address space, the second location commencing with a second address.

26. The method of claim 25 wherein the second address is different than the first address.

27. The method of claim 25 wherein the second address is the same as the first address.

28. The method of claim 25:
   wherein the first code block has a first size;
   wherein the second code block has a second size; and
   wherein the address space has a size less than a total of the first size and the second size.

29. The method of claim 25 wherein at lest one of the copying steps occurs at a time after start-up of the function device.

* * * * *